United States Patent [19]

Kitamura et al.

[11] Patent Number: 5,017,944
[45] Date of Patent: May 21, 1991

[54] CONTROL SYSTEM FOR INFORMATION RECORDING LASER BEAM

[75] Inventors: Hiroki Kitamura, Tokyo; Itsuo Takanashi, Kamakura; Takashi Yamamura, Yokohama; Toshikatsu Ichitou, Kawasaki; Hiromichi Tai, Yokosuka, all of Japan

[73] Assignee: Victor Company of Japan, Ltd., Yokohama, Japan

[21] Appl. No.: 486,834

[22] Filed: Mar. 1, 1990

[30] Foreign Application Priority Data

Mar. 6, 1989 [JP] Japan .................................. 1-53243
Jul. 25, 1989 [JP] Japan ................................ 1-192058

[51] Int. Cl.$^5$ ............................................. H04N 1/21
[52] U.S. Cl. .................................... 346/108; 358/298
[58] Field of Search ............... 346/108, 107 R, 76 L, 346/160; 358/296, 298, 300, 302

[56] References Cited

U.S. PATENT DOCUMENTS 4,477,821 10/1984 Yamamoto et al. ................. 346/108
4,864,419 9/1989 Saito et al. ............................ 346/160

FOREIGN PATENT DOCUMENTS 56-91228 7/1981 Japan .
58-212256 12/1983 Japan .
59-146068 8/1984 Japan .
61-124921 6/1986 Japan .
54115254 6/1986 Japan .
61-277258 12/1986 Japan .
61-277259 12/1986 Japan .
62-236204 10/1987 Japan .
62-247671 10/1987 Japan .
118621 4/1989 Japan .

Primary Examiner—Mark J. Reinhart
Attorney, Agent, or Firm—Pollock, VandeSande & Priddy

[57] ABSTRACT

In a control system for an information recording laser beam, an intensity of a laser beam is varied in a predetermined variation pattern during each of sequential one-pixel periods. The laser beam is periodically activated and deactivated in synchronism with a change of the one-pixel periods. A duration of the activating the laser beam within each of the one-pixel periods is controlled in accordance with a density of each of pixels of an image to be recorded.

7 Claims, 9 Drawing Sheets

CONTROL SYSTEM FOR INFORMATION RECORDING LASER BEAM

BACKGROUND OF THE INVENTION

1. Field of the Invention

This invention relates to a system for controlling an information recording laser beam.

2. Description of the Prior Art

In laser printers and various optical recording systems, a laser beam modulated with information is applied to a recording medium to record the information on the recording medium. Japanese published unexamined patent applications 61-277258, 61-277259, 61-26664, 59-146068, 56-91228, 62-247671, 61-124921, and 58-212256 relate to the recording of a halftone image into a recording medium by use of a laser light beam. In such halftone image recording, the intensity of a laser beam is modulated with image information, or the laser beam is subjected to pulse width modulation with the image information. In some cases, the laser beam is subjected to both intensity modulation and pulse width modulation.

In general, the above-mentioned prior art halftone image recording systems tend to be unreliable when a large number of different tone levels is required.

SUMMARY OF THE INVENTION

It is an object of this invention to provide an excellent control system for an information recording laser beam.

According to a first aspect of this invention, a control system for an information recording laser beam comprises means for varying an intensity of a laser beam in a predetermined variation pattern during each of sequential one-pixel periods; means for periodically activating and deactivating the laser beam in synchronism with a change of the one-pixel periods; and means for controlling the duration of said activation of the laser beam within each of the one-pixel periods in accordance with a density of each of the pixels of an image to be recorded.

According to a second aspect of this invention, a control system for an information recording laser beam emitted from a laser comprises means for varying an intensity of a laser beam in a variation pattern during each of sequential one-pixel periods; means for periodically activating and deactivating the laser beam in synchronism with a change of the one-pixel periods; means for controlling the duration of said activation of the laser beam within each of the one-pixel periods in accordance with a density of each of the pixels of an image to be recorded; means for detecting at least one wrong variation in the intensity of the laser beam and a wrong variation in a scan condition of the laser beam; and means for adjusting a peak level and a minimal level of the variation pattern to correct the intensity of the laser beam in accordance with at least one of the wrong variations.

According to a third aspect of this invention, a control system for an information recording laser beam whose intensity is modulated by a sequence of pulses comprises means for periodically varying a duty factor of the pulse sequence in synchronism with a change of successive one-pixel periods; and means for maximizing the duty factor of the pulse sequence at a time corresponding to a central part of each of the one-pixel regions.

BRIEF DESCRIPTION OF THE DRAWINGS

FIGS. 3a to 3h are a timing diagram showing the waveforms of various signals in the system of FIGS. 1 and 4.

FIGS. 6a to 6f are a timing diagram showing the waveforms of various signals in the laser printer of FIG. 5.

FIGS. 10a to 10j are a timing diagram showing the waveforms of various signals in the system of FIG. 8.

FIGS. 12a to 12h are a timing diagram showing the waveforms of various signals in the system of FIG. 11.

FIGS. 14a to 14f are a timing diagram of the waveforms of various signals in the pulse generator of FIG. 13.

FIGS. 17a to 17f are a timing diagram of the waveforms of various signals in the pulse generator of FIG. 16.

DESCRIPTION OF THE FIRST PREFERRED EMBODIMENT

Figure 1:
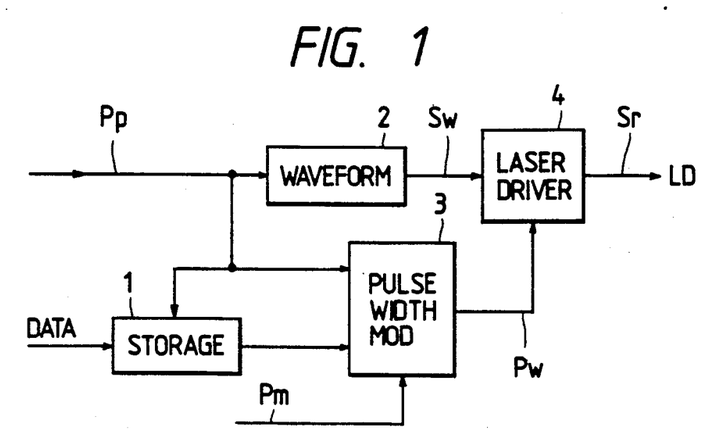
FIGS. 1 and 4 are diagrams of a laser beam control system according to a first embodiment of this invention.
Figure 3A:
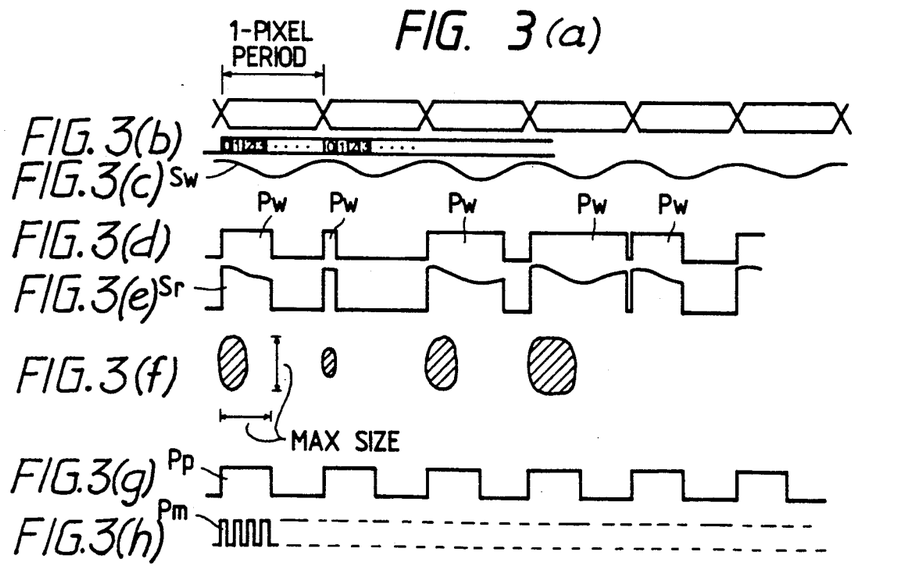
Figure 4:
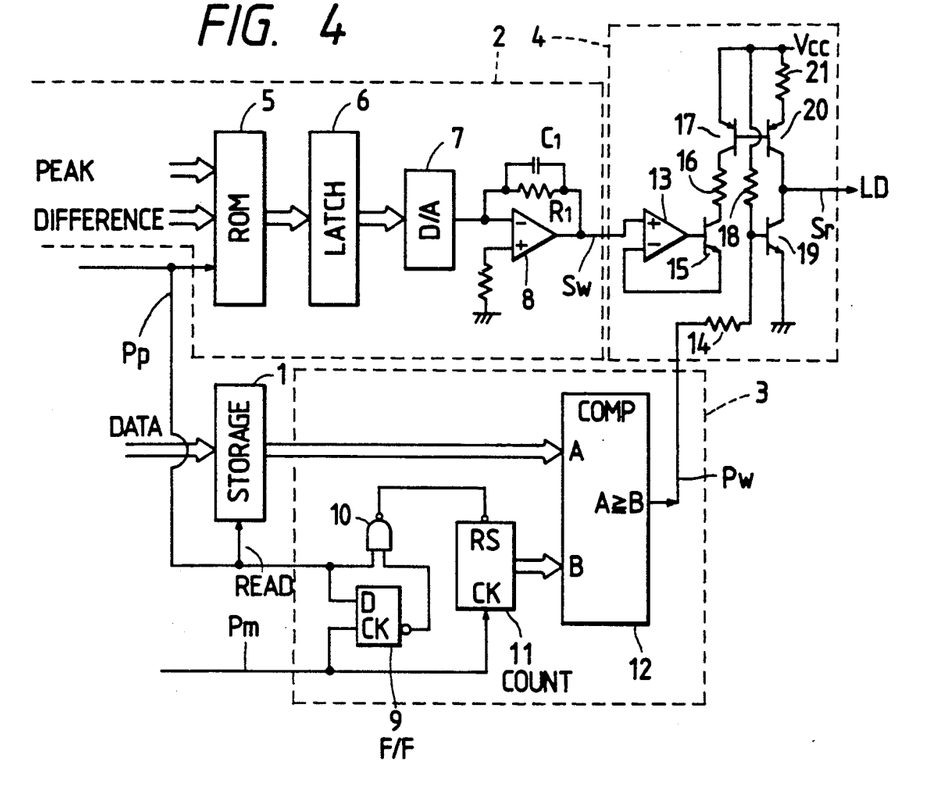

With reference to FIGS. 1 and 4, image data to be recorded are sequentially stored into a data storage 1 composed of a FIFO memory. The data sequentially represent information of the densities of respective pixels. The data are read out from the data storage 1 at a timing determined by a pixel clock signal Pp, and are fed to a pulse width modulator 3. The pixel clock signal Pp has a waveform such as shown in the part (g) of FIG. 3. The pixel clock signal Pp is derived from a master clock signal Pm through a frequency dividing process. The master clock signal Pm has a waveform such as shown in the part (h) of FIG. 3. The data read out from the data storage 1 compose a digital signal which has a one-pixel period as shown in the part (a) of FIG. 3.

A waveform generator 2 generates a signal Sw which can vary the intensity of a laser beam in accordance with a predetermined variation pattern during each one-pixel period. For example, the signal Sw has a recurrent sinusoidal waveform such as shown in the part (c) of FIG. 3. The period of the signal Sw equals the one-pixel period. The signal Sw is fed to a laser driver 4.

The pulse width modulator 3 receives the pixel clock signal Pp and the master clock signal Pm. The pulse width modulator 3 also receives the pixel density data from the data storage 1. The pulse width modulator 3 generates a signal Pw having a train of pulses whose widths depend on the pixel density data. As shown in the part (d) of FIG. 3, the signal Pw has one pulse for each one-pixel period. The signal Pw is fed to the laser driver 4.

The laser driver 4 generates a laser modulation signal Sr on the basis of the signals Sw and Pw fed from the waveform generator 2 and the pulse width modulator 3. The laser modulation signal Sr has a waveform such as shown in the part (e) of FIG. 3. As understood from the parts (c), (d), and (e) of FIG. 3, the laser modulation signal Sr is generated by superimposing the signal Sw upon pulses of the signal Pw. The laser modulation signal Sr is fed to a semiconductor laser LD.

The semiconductor laser LD is subjected to pulse drive by the laser modulation signal Sr, and emits a pulse laser beam which is modulated in the intensity and the pulse width with the laser modulation signal Sr. Specifically, the pulse width of the pulse laser beam depends on the component of the signal Sr which reflects the signal Pw. During each "on" time, the intensity of the pulse laser beam is varied in accordance with the component of the signal Sr which reflects the signal Sw. The laser beam is applied to a recording medium while the laser beam and the recording medium are moved relative to each other. The laser beam records a mark or a dot on the recording medium for each pixel. The area of the dot depends on the pixel density data. Accordingly, it is possible to record a halftone image whose tone level is continuously variable or whose tone is variable among different levels.

As shown in the part (f) of FIG. 3, the areas of the recorded dots are dependent on the density data of the respective pixels. At the highest pixel density, the recorded dot occupies an area defined by "max sizes" extending horizontally and vertically in the part (f) of FIG. 3. As the pixel density drops, the area occupied by the recorded dot decreases.

Figure 2:
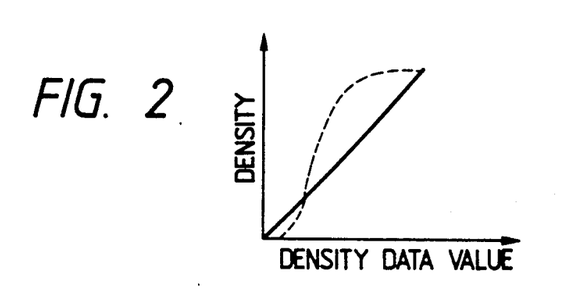
FIG. 2 is a diagram showing the relation between a density data value and an actual density.

As shown in the solid line of FIG. 2, the actual density of a pixel is proportional to the value of the pixel density data. On the other hand, in prior art systems where the intensity of a pulsed laser beam is constant during each "on" time, the reproduced density of a pixel is unproportional to the value of pixel density data as shown by the broken line of FIG. 2. This unproportional relation results from the following non-uniform intensity distribution in the cross section of the laser beam and a threshold of sensitivity to the laser beam of a medium used for the reproduction of the pixel. In the cross section of the laser beam, the light intensity of a point gradually decreases as the point moves from the center to the edge of the cross section. This invention compensates the non-uniform intensity distribution of the laser beam and realizes the proportional relation between the actual density of a pixel and the value of the pixel density data by varying the intensity of the pulse laser beam during each "on time" in accordance with the signal Sw.

As shown in the parts (a) and (g), at a moment of the occurrence of the front edge of each pulse of the pixel clock signal Pp, the pixel density data are read out from the data storage 1. The readout pixel density data are fed to a comparator 12 within the pulse width modulator 3. The comparator 12 compares the pixel density data with reference data for each pixel, generating the signal Pw. When the value of the pixel density data is equal to or greater than the value of the reference data, the signal Pw is in a high level state. Otherwise, the signal Pw is in a low level state. The reference data repeatedly vary at a period equal to the one-pixel period.

As shown in the part (b) of FIG. 3, during each one-pixel period, the value of the reference data increases stepwise from 0 to a predetermined value. The reference data are generated by a combination of a D flip-flop 9, a NAND circuit 10, and a counter 11 within the pulse width modulator 3. The master clock signal Pm is fed to the clock input terminals of the D flip-flop 9 and the counter 11. The pixel clock signal Pp is fed to the data input terminal of the D flip-flop 9 and a first input terminal of the NAND circuit 10. The inverting output terminal of the D flip-flop 9 is connected to a second input terminal of the NAND circuit 10. The output terminal of the NAND circuit 10 is connected to the reset terminal of the counter 11. The counter 11 outputs the reference data to the comparator 12. At a start of each one-pixel period, the counter 11 is reset in response to the output signal from the NAND circuit 10. During each one-pixel period, the counter 11 counts up pulses of the master clock signal Pm so that the output data value from the counter 11 increases from 0 to a predetermined value one by one.

During each one-pixel period, the output signal Pw from the comparator 12 remains at the high level until the value of the reference data reaches the value of the pixel density data, and the signal Pw changes to and remains at the low level when the value of the reference data is equal to or greater than the value of the pixel density data. Accordingly, the width of a pulse of the signal Pw increases with the value of the pixel density data. The output signal Pw from the comparator 12 is fed via a resistor 14 to the base of a switching transistor 19 within the laser driver 4. The emitter-collector path of the transistor 19 is periodically made conductive and non-conductive in response to the signal Pw.

The waveform generator 2 includes a read-only memory (ROM) 5. The ROM 5 stores data determining the peak level of the signal Sw (see FIG. 3), and data determining the difference between the peak level and the minimal level of the signal Sw. During each one pixel period, the ROM 5 outputs the peak level data and the peak-minimal difference data in response to a pulse of the pixel clock signal Pp. The output data from the ROM 5 are fed to a digital-to-analog (D/A) converter 7 via a latch 6 within the waveform generator 2. The latch 6 functions to stabilize the data fed from the ROM 5 to the D/A converter 7. The D/A converter 7 converts the peak level data and the peak-minimal difference data into corresponding analog signals. An integrator-type filter composed of an operational amplifier 8, a resistor R1, and a capacitor C1 generates the signal Sw on the basis of the output signals from the D/A converter 7. As shown in the part (c) of FIG. 3, the signal Sw has a recurrent waveform of a period equal to the one-pixel period. For example, the waveform of the signal is sinusoidal. During each one-pixel period, the level of the signal Sw varies between the peak level and the minimal level in a predetermined pattern designed so as to compensate the prior art unproportional relation between the actual density of a pixel and the value of the pixel density data. The peak level of the signal Sw is determined by the peak level data outputted from the ROM 5. The minimal level of the signal Sw is determined by both the peak level data and the peak-minimal difference data outputted from the ROM 5.

The laser driver 4 includes a differential amplifier 13 receiving the signal Sw. The laser driver 4 has a superimposing circuit including the differential amplifier 13, transistors 15, 17, and 20, the previously-mentioned switching transistor 19, the resistor 14, and resistors 16, 18, and 21. As shown in the parts (c), (d), and (e) of FIG. 3, during each "on" time of the signal Pw, the superimposing circuit superimposes the signal Sw upon the signal Pw and thereby generates the laser modulation signal Sr.

Figure 5:
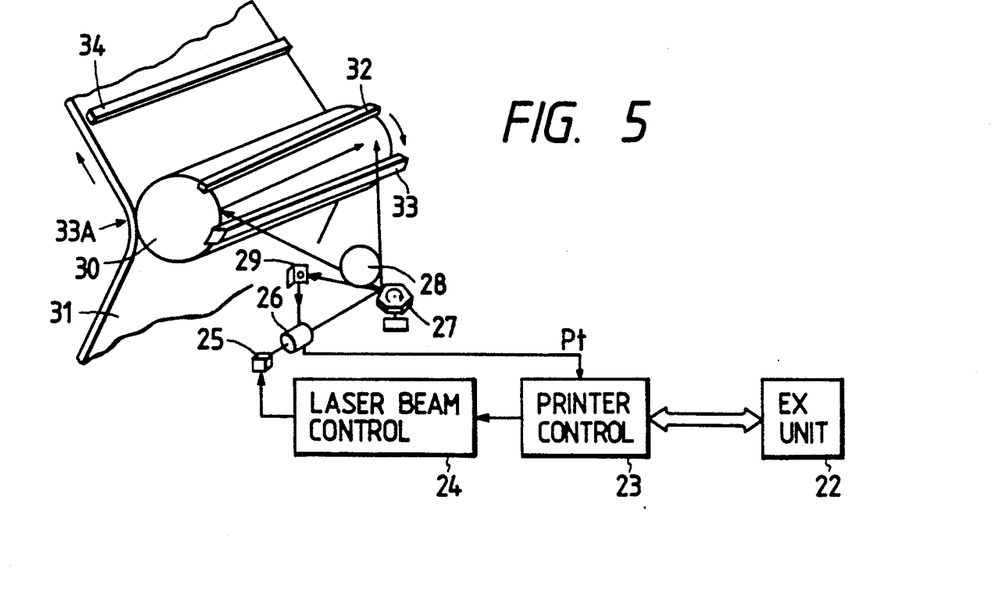
FIG. 5 is a diagram of a laser printer including the laser beam control system of FIGS. 1 and 4.

FIG. 5 shows a laser printer including a laser beam controller 24 having the structure of FIGS. 1 and 4. The laser beam controller 24 outputs the laser modulation signal Sr to a semiconductor laser 25. The semiconductor laser 25 emits a pulse laser beam which is modulated in the intensity and the pulse width with the laser modulation signal Sr. The emitted laser beam is converted by a collimator lens 26 into parallel light. The parallel light is reflected by a polygon mirror 27, and is then focused by a doublet spatial lens 28 into a spot on the surface of a photosensitive drum 30. The polygon mirror 27 is rotated so that the surface of the photosensitive drum 30 is scanned by the laser beam spot in the axial direction. The photosensitive drum 30 is rotated about its axis so that the photosensitive drum 30 is two-dimensionally scanned by the laser beam spot.

A photo detector 29 is placed in a predetermined position where the photo detector 29 is periodically exposed to the laser light through the doublet spatial lens 28. The photo detector 29 periodically senses the laser light, generating a timing signal Pt. The timing signal Pt has a waveform such as shown in the part (a) of FIG. 6. The timing signal Pt is fed to a printer controller 23. The printer controller 23 controls the laser beam controller 24 in response to the timing signal Pt so that the timing of the scan of the photosensitive drum 30 can be determined by the timing signal Pt.

The printer controller 23 outputs the master clock signal Pm, the pixel clock signal Pp, and the pixel density data to the laser beam controller 24. The printer controller 23 also outputs a write start signal, a memory write clock signal, and a horizontal start signal to the laser beam controller 24. The write start signal, the memory write clock signal, the pixel density data, the horizontal start signal, and the pixel clock signal Pp have waveforms such as shown in the parts (b), (c), (d), (e), and (f) of FIG. 6 respectively.

Figures 6A, 6F:
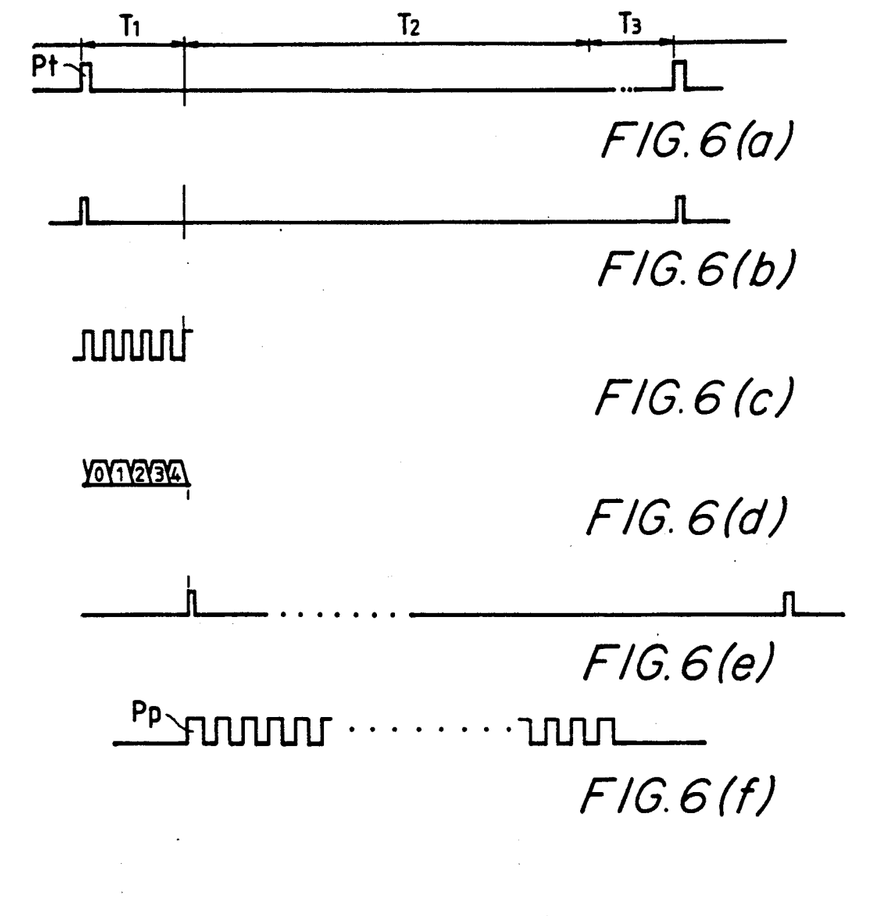

The write start signal is generated on the basis of the timing signal Pt. The write start signal performs a write reset action on the data storage 1, determining a head of the pixel density data. The memory write clock signal and the pixel density data are inputted into the laser beam controller 24, and the pixel density data are written into the data storage 1. When a time T1 elapses from the moment of the occurrence of a pulse of the timing signal Pt, a pulse of the horizontal start signal is generated as shown in FIG. 6. The moment of the occurrence of a pulse of the horizontal start signal agrees with the moment at which the laser beam spot reaches the edge of the recording area of the photosensitive drum 30. At the moment of the occurrence of a pulse of the horizontal start signal, the pixel density data starts to be read out from the data storage 1.

A time T2 shown in FIG. 6 corresponds to the period during which the laser beam spot scans the recording area of the photosensitive drum 30. During this period T2, one horizontal line of the pixel density data is recorded on the photosensitive drum 30. It is preferable that pulses of the pixel clock signal Pp be outputted to the laser beam controller 24 only during the period T2 and that the pixel clock signal Pp be continuously kept in the low level during the other period. This design reduces the number of errors generated upon the occurrence of pulses of the timing signal Pt.

The photosensitive drum 30 has a photoconductive layer which is provided with the photosensitivity by corona discharge in a charging section 32. As the photoconductive layer of the photosensitive drum 30 is scanned by the laser beam spot, a charge latent image is formed on the photosensitive drum 30 in accordance with the laser modulation signal Sr including the pixel density data. A development section 33 develops the charge latent image into a corresponding toner image by using toner. The toner image is transferred by a transfer section 33A to a recording paper 31. The transferred toner image is fixed on the recording paper 31 by a fixing section 34. The fixed image on the recording paper 31 is composed of equally-sized pixel regions having respective parts covered by the toner whose dimensions depend on the density data of the respective pixels. Accordingly, the fixed image on the recording paper 31 can be expressed in a plurality of different halftone levels.

Image information to be recorded is inputted into the printer controller 23 from an external equipment such as a host computer or an input device. The printer controller 23 temporarily stores the image information and processes the image information, converting the image information into the pixel density data.

Figure 7:
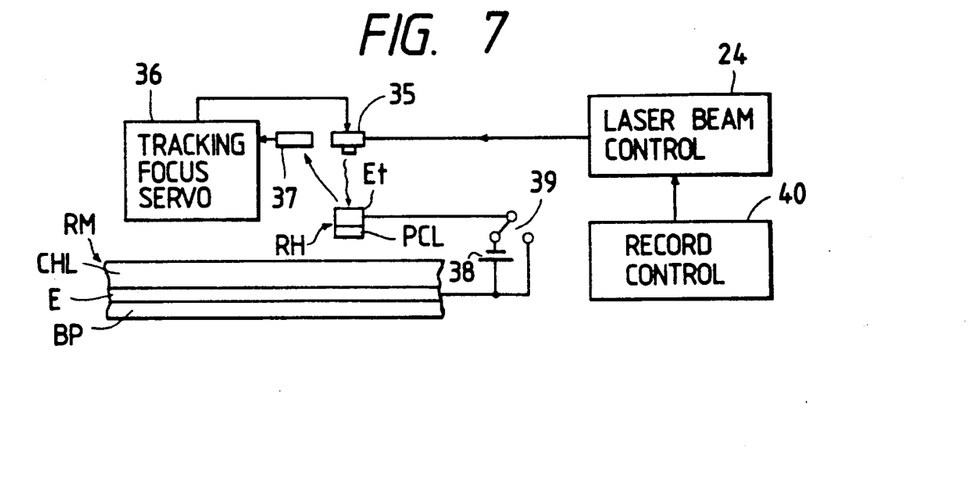
FIG. 7 is a diagram of a recording apparatus including the laser beam control system of FIGS. 1 and 4.

FIG. 7 shows a recording apparatus including a laser beam controller 24 having the structure of FIGS. 1 and 4. The recording apparatus of FIG. 7 also includes a record controller 40 which outputs the master clock signal Pm, the pixel clock signal Pp, the pixel density data, and other control signals to the laser beam controller 24. The laser beam controller 24 outputs the laser modulation signal Sr to a semiconductor laser 35. The semiconductor laser 35 emits a pulse laser beam which is modulated in the intensity and the pulse width with the laser modulation signal Sr. The emitted laser beam is focused on a photoconductive layer PCL of a recording head RH so that the electric resistance of the photoconductive layer PCL varies with the intensity of the laser beam.

A transparent electrode Et of the recording head RH is electrically connected to an electrode E of a recording medium RM via a switch 39 and a power supply 38. When the switch 39 is closed, spark discharge is generated between the photoconductive layer PCL of the recording head RH and a charge holding layer CHL of the recording medium RM by the electric potential applied from the power supply 38. In the recording medium RM, the electrode E and the charge holding layer CHL are supported on a base plate BP. While the laser beam and the recording medium RM are moved relative to each other, the spark discharge enables a charge latent image to be formed on the charge holding layer CHL of the recording medium RM in accordance with the the laser beam. The charge latent image is composed of equally-sized pixels having respective color-generating or black-generating parts whose dimensions depend on the density data of the respective pixels. Accordingly, the charge latent image on the recording medium RM can be expressed in a plurality of different halftone levels.

The timing of the scan of the recording medium RM is chosen in dependence upon the shape of the recording medium RM. A position sensor 37 feeds a tracking and focus servo controller 36 with a position signal representative of the position of the recording head RH or the laser beam. The tracking and focus servo controller 36 controls the semiconductor laser 35 in accordance with the position signal to enable tracking and focus servo control of the laser beam.

DESCRIPTION OF THE SECOND PREFERRED EMBODIMENT

Figure 8:
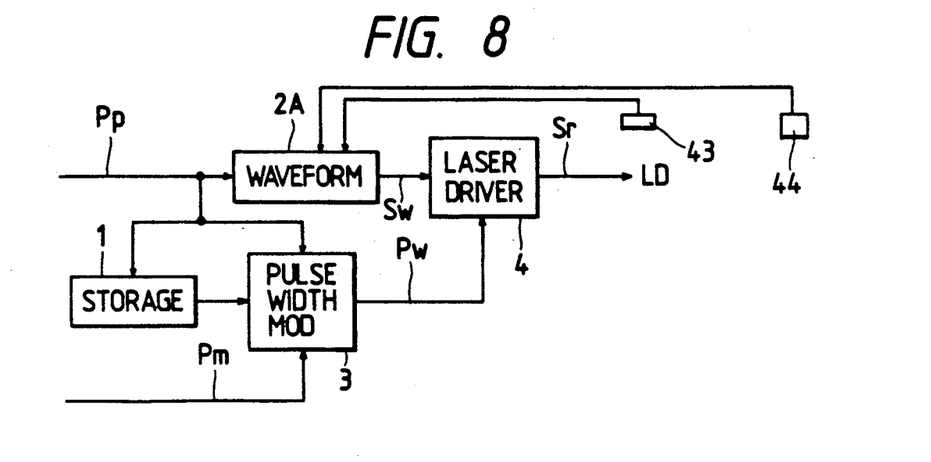
FIG. 8 is a block diagram of a laser beam control system according to a second embodiment of this invention.

FIG. 8 shows a laser beam controller according to a second embodiment of this invention which is similar to the embodiment of FIGS. 1 and 4 except for design changes indicated hereinafter. As shown in FIG. 8, the second embodiment includes photo sensors 43 and 44. The photo sensor 43 detects the intensity of a laser beam during a period for which the laser beam is unmodulated. The photo sensor 44 detects the intensity of the laser beam during a period for which the laser beam is modulated. Output signals from the photo sensors 43 and 44 are fed to a waveform generator 2A.

Figure 9:
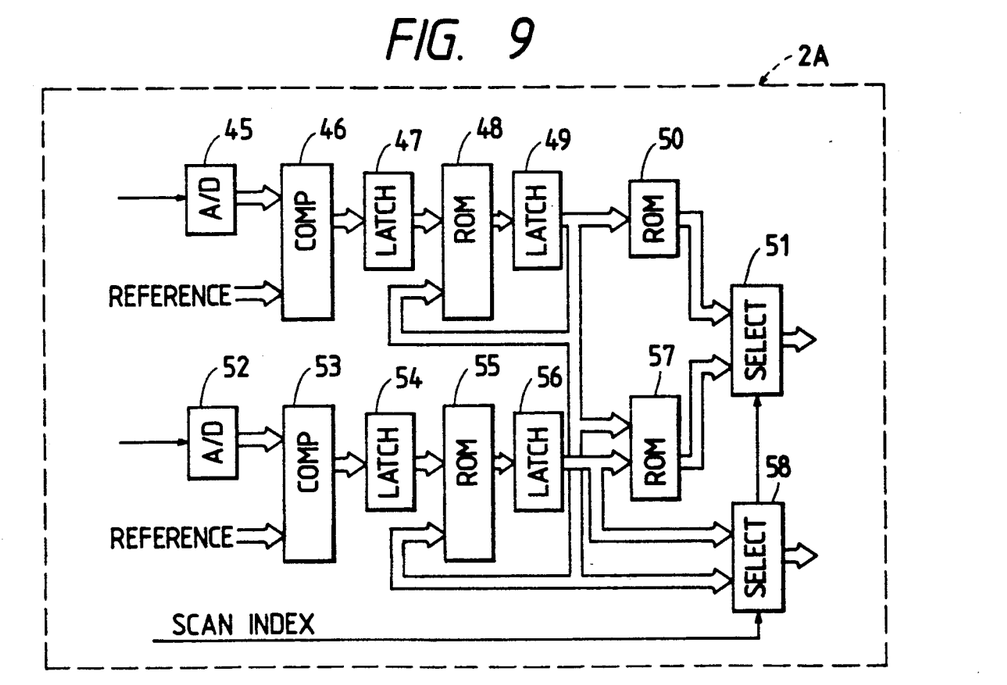
FIG. 9 is a block diagram of a part of the waveform generator in FIG. 8.
Figure 10A:
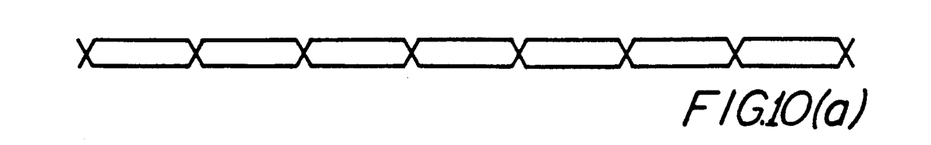
Figure 10B:
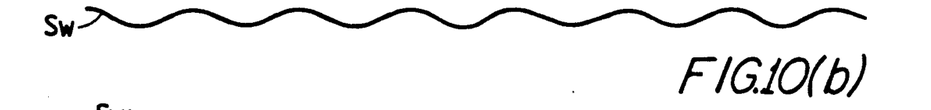
Figure 10C:
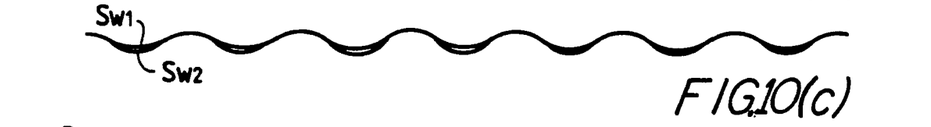
Figure 10D:
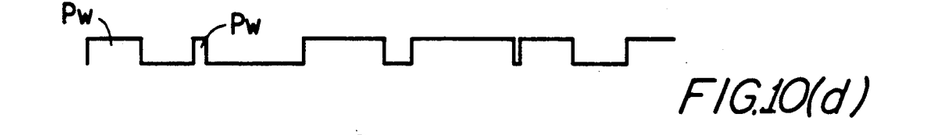
Figure 10E:
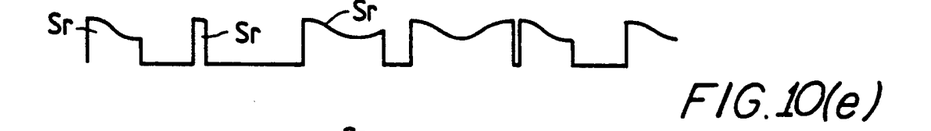
Figure 10F:
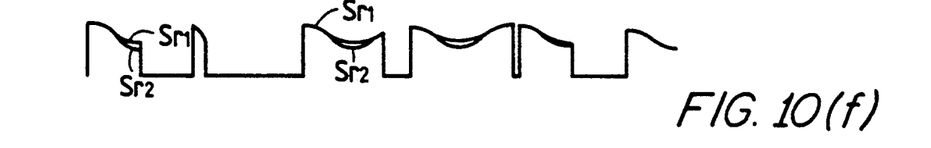
Figure 10G:
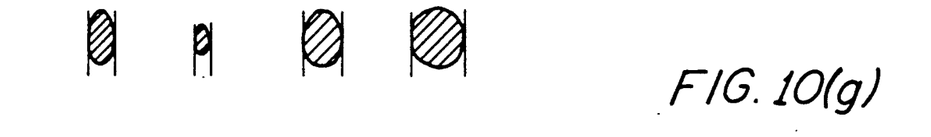
Figure 10H:
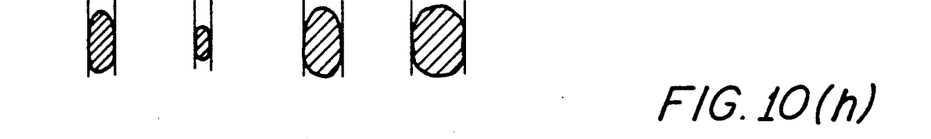
Figure 10I:
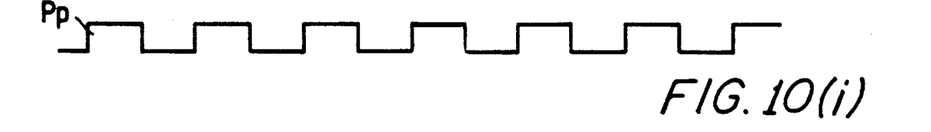
Figure 10J:
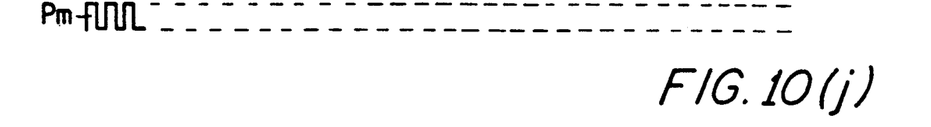

As shown in FIG. 9, the waveform generator 2A includes analog-to-digital (A/D) converters 45 and 52 receiving the output signals from the photo sensors 43 and 44 respectively. The A/D converter 45 converts the unmodulated-beam intensity signal into a corresponding digital signal. A comparator 46 compares the output data from the A/D converter 45 with a reference value. An output signal from the comparator 46 is fed to a ROM 48 via a latch 47. The latch 47 stabilizes the signal fed from the comparator 46 to the ROM 48. An output signal from the ROM 48 is fed back to the ROM 48 via a latch 49. The output signal from the ROM 48 is also fed to ROMs 50, 55, 57, and a selector 58 via the latch 49. The latch 49 stabilizes the signal fed from the ROM 48 back to the ROM 48, and to the other devices 50, 55, 57, and 58. For the protection of a semiconductor laser, it is preferable that an initial value of the latch 49 is set to 0. The output signal from the ROM 48 is used as an indication of the peak intensity of the laser beam during the beam-unmodulated period. The ROM 50 generates a signal representing the difference between the peak intensity and the minimal intensity of the laser beam on the basis of the output signal from the ROM 48. The peak-minimal difference signal is fed from the ROM 50 to a selector 51.

The A/D converter 52 converts the modulated-beam intensity signal into a corresponding digital signal. A comparator 53 compares the output data from the A/D converter 52 with a reference value. An output signal from the comparator 53 is fed to the ROM 55 via a latch 54. The latch 54 stabilizes the signal fed from the comparator 53 to the ROM 55. An output signal from the ROM 55 is fed to the ROM 57 and the selector 58 via a latch 56. The latch 56 stabilizes the signal fed from the ROM 55 to the ROM 57 and the selector 58. The output signal from the ROM 55 is used as an indication of the peak intensity of the laser beam during the beam-modulated period. The ROM 57 generates a signal representing the difference between the peak intensity and the minimal intensity of the laser beam on the basis of the beam-unmodulated peak signal and the beam-modulated peak signal outputted from the ROMs 48 and 55 respectively. The peak-minimal difference signal is fed from the ROM 57 to the selector 51.

The selector 51 selects one of the peak-minimal difference signals from the ROMs 50 and 57 in accordance with a scan index signal, and feeds the selected signal to a ROM 5 (see FIG. 4). The selector 58 selects either beam-unmodulated peak signal or the beam-modulated peak signal from the ROMs 48 and 55 in accordance with the scan index signal, and feeds the selected signal to the ROM 5 (see FIG. 4). The peak-minimal difference signal and the peak signal selected by the selectors 51 and 58 are written into the ROM 5 (see FIG. 4). As described previously, during each one pixel period, the ROM 5 (see FIG. 4) outputs the peak level data and the peak-minimal difference data in response to a pulse of the pixel clock signal Pp.

The laser beam controller of FIGS. 8 and 9 can be used in the laser printer of FIG. 5. The intensity of the laser beam during the beam-unmodulated period varies in accordance with the ageing of the semiconductor laser or a variation in the temperature of the semiconductor laser. Accordingly, the output signal from the photo sensor 43 represents such a wrong variation in the intensity of the laser beam during the beam-unmodulated period. The ROM 48 functions to compensate for the wrong variation in the intensity of the laser beam.

The intensity of the laser beam during the beam-modulated period varies in accordance an unevenness in the pitch of the scanning lines which is caused by an error of the position of the polygon mirror 27. Accordingly, the output signal from the photo sensor 44 represents such an unevenness in the scanning line pitch during the beam-modulated period. The beam peak value represented by the output signal from the ROM 55 is determined in correspondence with the unevenness in the scanning line pitch. The ROM 57 functions to compensate for the unevenness in the scanning line pitch.

During the activation of the semiconductor laser, the intensity of the laser beam is generally proportional to the drive current through the semiconductor laser. Accordingly, the difference between the peak value and the minimal value of the laser beam which is determined by the peak value in the beam-unmodulated period may be independent of a variation in the peak value of the laser beam. In this case, the waveform of an output signal Sw1 from the waveform generator 2A of FIG. 8 is the same as the waveform of the output signal Sw of the waveform generator 2 of FIG. 1 as shown in the parts (b) and (c) of FIG. 10. In addition, the waveform of an output signal Sr1 from a laser driver 4 of FIG. 8 is the same as the waveform of the output signal Sr from the laser driver 4 of FIG. 1 as shown in the parts (e) and (f) of FIG. 10, and recorded dots are formed as shown in the part (g) of FIG. 10.

The difference between the peak value and the minimal value of the laser beam which is determined by the peak value in the beam-modulated period may be chosen so that the minimal value of the laser beam will decrease as the peak value of the laser beam increases. In this case, the output signal Sw2 from the waveform generator 2A takes a waveform such as shown in the part (c) of FIG. 10 while the output signal Sr2 from the laser driver 4 takes a waveform such as shown in the part (f) of FIG. 10. In this case, recorded dots are formed as shown in the part (h) of FIG. 10.

DESCRIPTION OF THE THIRD PREFERRED EMBODIMENT

Figure 11:
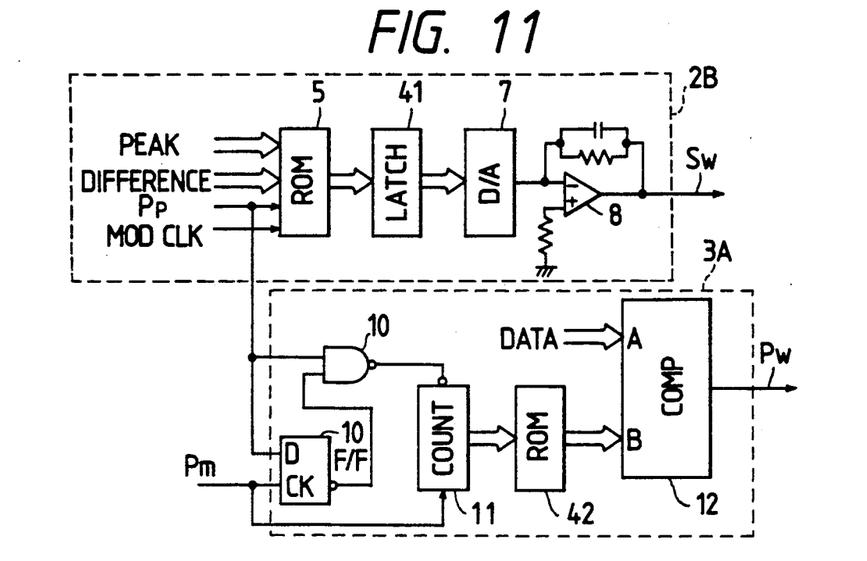
FIG. 11 is a block diagram of a laser beam control system according to a third embodiment of this invention.

FIG. 11 shows a third embodiment of this invention which is similar to the embodiment of FIGS. 1 and 4 except for design changes indicated hereinafter. In the embodiment of FIG. 11, a modulation clock signal is fed to a ROM 5A of a waveform generator 2B to start the recording at the center of each pixel. In addition, a pulse width modulator 3 includes a ROM 42 holding data representing a predetermined pulse modulation pattern. The output signal from a counter 11 is fed to the ROM 42, and the output signal from the ROM 42 is fed to a comparator 12.

Figure 12A:
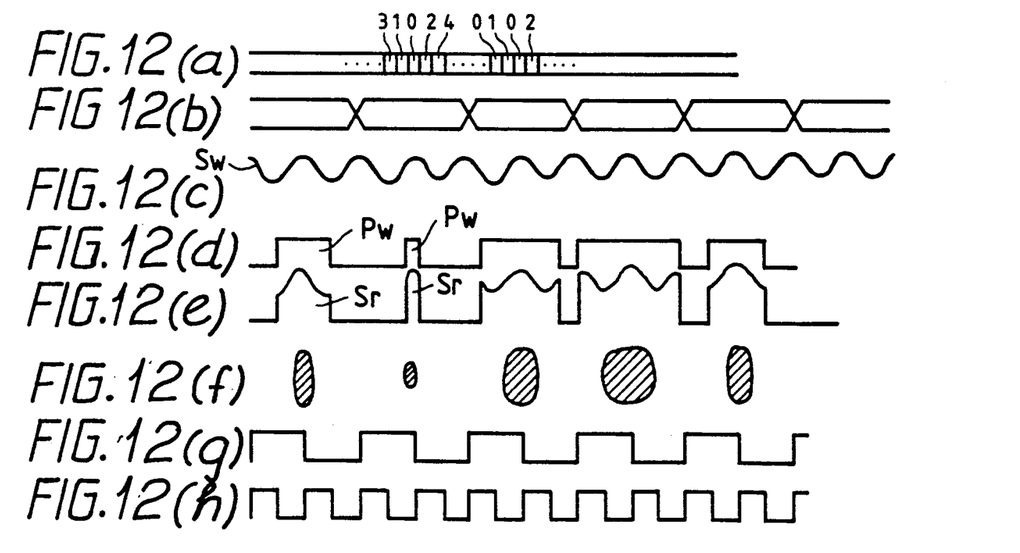

The modulation clock signal has a waveform such as shown in the part (h) of FIG. 12. For example, the modulation clock signal is generated by doubling the frequency of a pixel clock signal shown in the part (g) of FIG. 12. The reading data from the ROM 5A is repeatedly performed in response to the modulation clock signal. Therefore, as shown in the part (c) of FIG. 12, the output signal Sw from the waveform generator 2B has sinusoidal waveform whose frequency equals twice the frequency of the output signal from the waveform generator 2 of FIG. 1. Specifically, as a laser beam spot moves from a first edge to a center of each pixel, the level of the signal Sw drops from a peak level to a minimal level and then returns to the peak level. As the laser beam spot moves from the center to a second edge of the pixel, the level of the signal Sw drops from the peak level to the minimal level and then returns to the peak level. As shown in the part (f) of FIG. 12, the recording is started at the center of each pixel. The value of the pulse modulation pattern data outputted from the ROM 42 varies as shown in the part (a) of FIG. 12. The part (b) of FIG. 12 shows pixel density data. The output signal Pw from the pulse width modulator 3 has a waveform such as shown in the part (d) of FIG. 12. The output signal Sr from a laser driver (not shown in FIG. 11) has a waveform such as shown in the part (e) of FIG. 12.

DESCRIPTION OF THE FOURTH PREFERRED EMBODIMENT

Figure 13:
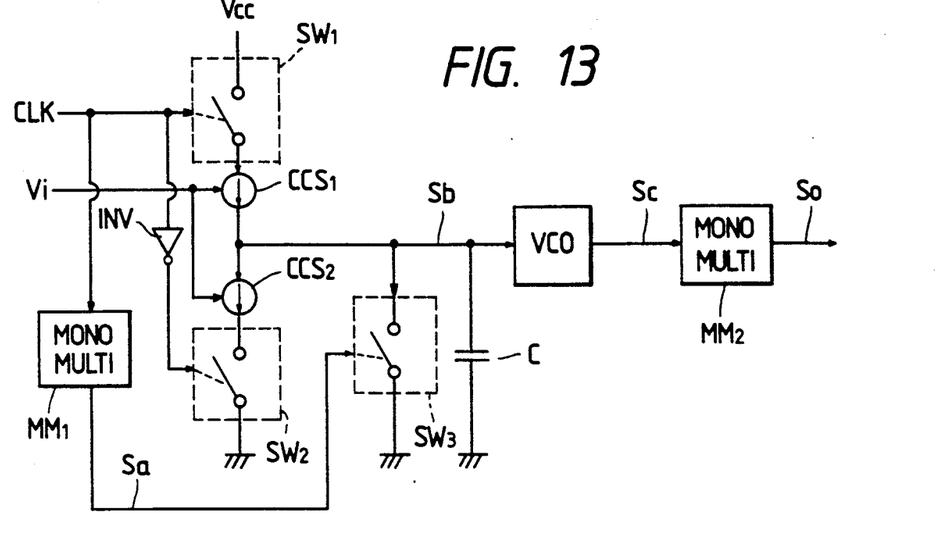
FIG. 13 is a diagram of a pulse generator of a laser beam control system according to a fourth embodiment of this invention.

FIG. 13 shows a fourth embodiment of this invention which is directed to a pulse generator used in the laser light intensity modulating section of a halftone image recording apparatus. With reference to FIG. 13, a switch SW1 is changed by a clock signal CLK of a rectangular waveform. As shown in the part (a) of FIG. 14, the clock signal CLK has a period equal to a time during which a laser beam spot moves across a one-pixel region. While the clock signal CLK remains at a high level, the switch SW1 is closed so that a power supply Vcc is connected to a current regulator CCS1.

The current regulator CCS1 outputs a current having a constant value which depends on the amplitude of an image signal Vi. The image signal Vi has a waveform such as shown in the part (b) of FIG. 14. An output side of the current regulator CCS1 is connected to an input side of a current regulator CCS2, a control terminal of a voltage-controlled oscillator VCO, one terminal of a switch SW3, and one terminal of a capacitor C. The other terminals of the switch SW3 and the capacitor C are grounded.

Figure 14A:
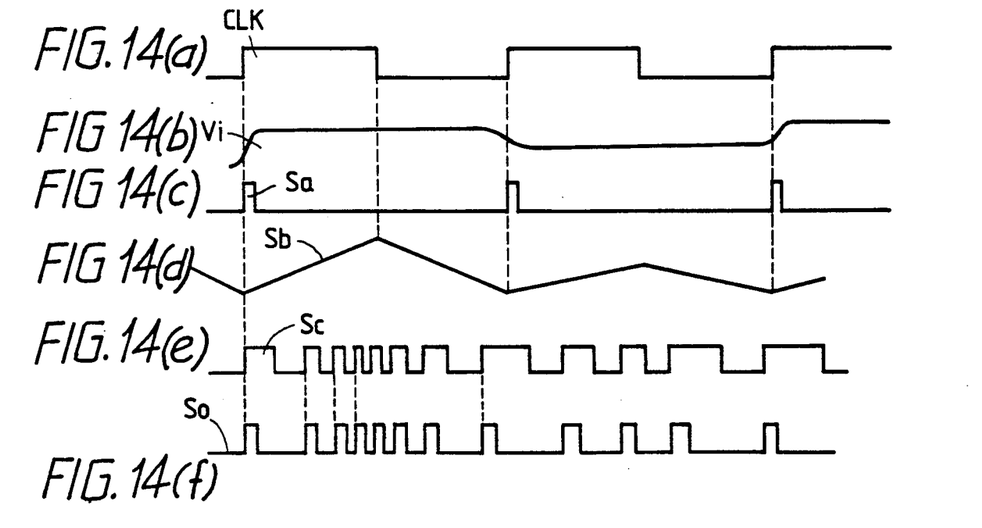

A monostable multivibrator MM1 is triggered by the positive going edge of each pulse in the clock signal CLK, generating a pulse signal Sa such as shown in the part (c) of FIG. 14. The switch SW3 is closed by each pulse of the signal Sa, shortcircuiting the capacitor C.

An output side of the current regulator CCS2 is grounded via a switch SW2. The switch SW2 is changed by an output signal from an inverter INV which inverts the clock signal CLK. While the output signal from the inverter INV remains at a high level, the switch SW2 is closed so that the switch SW2 shortcircuits the capacitor C via the current regulator CCS2. The shortcircuiting current is held by the current regulator CCS2 at a constant level which depends on the image signal Vi.

At the moment of the change of the clock signal CLK from the low level to the high level, the monostable multivibrator MM1 outputs a pulse Sa to the switch SW3, shortcircuiting the capacitor C and resetting the voltage Sb across the capacitor C which is applied to the oscillator VCO as a control signal. During a subsequent period for which the clock signal CLK remains at the high level, the switch SW1 is closed by the clock signal CLK so that the power supply Vcc is connected to the current regulator CCS1 and the capacitor C is charged by a constant current fed from the current regulator CCS1. Thus, during this period, the level of the control signal Sb fed to the oscillator VCO increases from a reset level at a constant rate as shown in the part (d) of FIG. 14. This rate of the increase in the level of the control signal Sb is determined by the video signal Vi. During a next period for which the clock signal remains at the low level, the switch SW1 is opened but the switch SW2 is closed by the output signal from the inverter INV so that the capacitor SW3 is discharged via the current regulator CCS2 and the switch SW2 at a constant rate. Thus, during this period, the level of the control signal Sb fed to the oscillator VCO decreases at a constant rate as shown in the part (d) of FIG. 14. This rate of the decrease in the level of the control signal Sb is determined by the video signal Vi. In this way, the level of the control signal Sb fed to the oscillator VCO varies in a triangular form synchronous with the clock signal CLK. In the case where the clock signal CLK has a duty factor of 0.5, the level of the control signal Sb is maximized when the laser beam spot scans around the center of each pixel region.

The oscillator VCO outputs a pulse signal Sc whose frequency varies in accordance with the triangular variation in the control signal Sb as shown in the part (e) of FIG. 14. In general, the output signal Sc from the oscillator VCO has pulses of varying widths. The output signal Sc from the oscillator VCO is fed to a monostable multivibrator MM2. The monostable multivibrator MM2 converts the signal Sc into a corresponding signal So which has pulses of equal widths as shown in the part (f) of FIG. 14. The signal So is used as a halftone image recording signal including pulses whose density is maximized at the central part of each pixel region.

Figure 15:
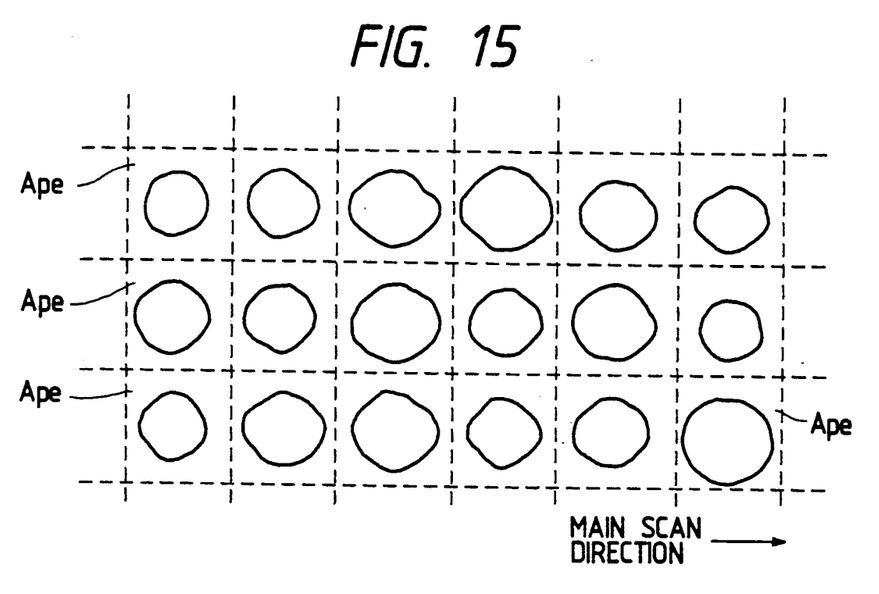
FIG. 15 is a diagram showing recorded dots in respective one-pixel regions in respect of the fourth embodiment.

The intensity of the laser beam is modulated by a known circuit in accordance with the output signal So from the monostable multivibrator MM2. As a result of this modulation, the intensity of the laser beam is maximized when the laser beam spot scans around the center of each pixel region. Accordingly, as shown in FIG. 15, recorded dots in respective one-pixel regions Ape swell in their central parts.

DESCRIPTION OF THE FIFTH PREFERRED EMBODIMENT

Figure 16:
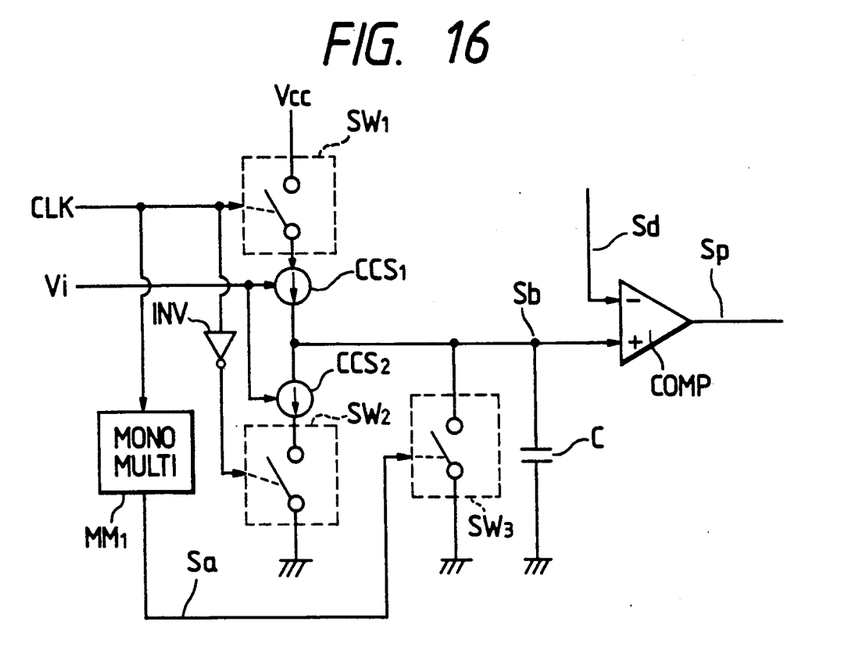
FIG. 16 is a diagram of a pulse generator of a laser beam control system according to a fifth embodiment of this invention.
Figure 17:
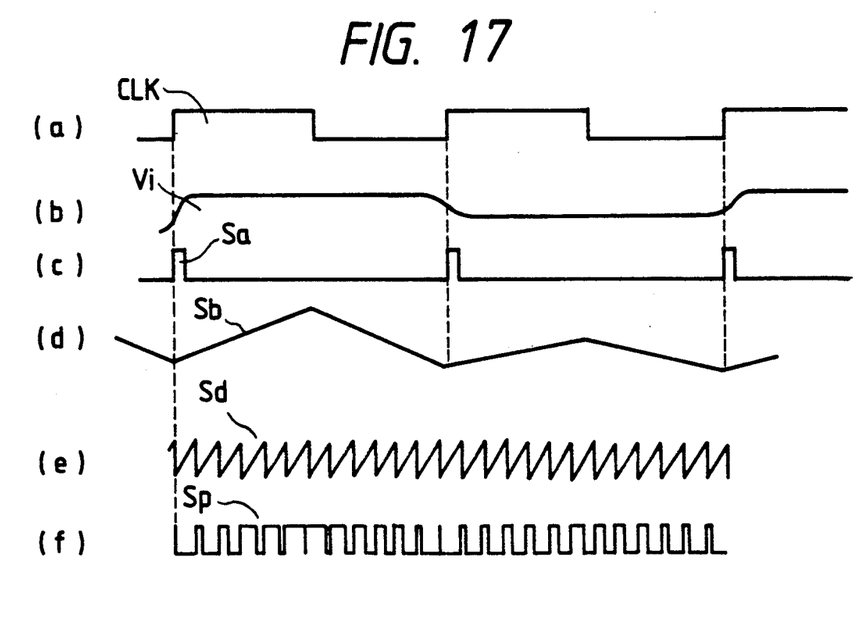

FIG. 16 shows a fifth embodiment of this invention which is similar to the embodiment of FIGS. 13-15 except for design changes indicated hereinafter. The embodiment of FIG. 16 includes a comparator COMP whose first input terminal receives a triangular signal voltage Sb across a capacitor C. The voltage Sb has a waveform such as shown in the part (d) of FIG. 17. A sawtooth wave signal Sd is fed to a second input terminal of the comparator COMP. As shown in the part (e) of FIG. 17, the sawtooth wave signal Sd has a constant frequency much higher than the frequency of a clock signal CLK (see the part (a) of FIG. 17) or the frequency of the triangular signal voltage Sb. The comparator COMP compares the triangular signal voltage Sb and the sawtooth wave signal Sd, generating a signal Sp having a waveform such as shown in the part (f) of FIG. 17. The signal Sp has varying-width pulses whose frequency is essentially constant in agreement with the frequency of the sawtooth wave signal Sd. The width of a pulse of the signal Sp increases as the pulse moves from a first position to a second position which corresponds to an edge and the center of each one-pixel region respectively. In other words, the width of a pulse of the signal Sp is maximized when a laser beam scans around the center of each pixel region. The signal Sp is used as a halftone image recording signal.

What is claimed is:

1. A control system for an information recording laser beam, comprising:
   means for varying an intensity of a laser beam in a predetermined variation pattern during each of sequential one-pixel periods;
   means for periodically activating and deactivating the laser beam in synchronism with a change of the one-pixel periods; and
   means for controlling a duration of said activating the laser beam within each of the one-pixel periods in accordance with a density of each pixel of an image to be recorded.

2. The control system of claim 1 wherein the activating/deactivating means comprises means for periodically activating the laser beam in response to pulses of a pulse signal; a width of each of the pulses determines the duration of the activating the laser beam within each of the one-pixel periods; and the controlling means comprises means for controlling the width of each of the pulses in accordance with the density of each of the pixels of the image.

3. A control system for an information recording laser beam emitted from a laser, comprising:
   means for varying an intensity of a laser beam in a variation pattern during each of sequential one-pixel periods;
   means for periodically activating and deactivating the laser beam in synchronism with a change of the one-pixel periods;
   means for controlling a duration of said activating the laser beam within each of the one-pixel periods in accordance with a density of each of pixel of an image to be recorded;
   means for detecting at least one of a wrong variation in the intensity of the laser beam and a wrong variation in a scan condition of the laser beam; and
   means for adjusting a peak level and a minimal level of the variation pattern to correct the intensity of the laser beam in accordance with at least one of the wrong variations.

4. The control system of claim 3 wherein the activating/deactivating means comprises means for periodically activating the laser beam in response to pulses of a pulse signal; a width of each of the pulses determines the duration of the activating the laser beam within each of the one-pixel periods; and the controlling means comprises means for controlling the width of each of the pulses in accordance with the density of each of the pixels of the image.

5. A control system for an information recording laser beam whose intensity is modulated by a sequence of pulses, the system comprising:
   means for periodically varying a duty factor of the pulse sequence in synchronism with a change of successive one-pixel periods; and
   means for maximizing the duty factor of the pulse sequence at a time corresponding to a central part of each of one-pixel regions.

6. The control system of claim 5 wherein the varying means comprises means for varying a frequency of the pulse sequence in synchronism with the change of the successive one-pixel periods.

7. The control system of claim 5 wherein the varying means comprises means for varying a width of each of the pulses in synchronism with the change of the successive one-pixel periods.

* * * * *